(12) United States Patent
Zalmanovici

(10) Patent No.: US 9,182,956 B2
(45) Date of Patent: Nov. 10, 2015

(54) FLATTENING CONDITIONAL STATEMENTS

(75) Inventor: Marcel Zalmanovici, Kiriat Motzkin (IL)

(73) Assignee: International Business Machines Corporation, Armonk, NY (US)

( * ) Notice: Subject to any disclaimer, the term of this patent is extended or adjusted under 35 U.S.C. 154(b) by 520 days.

(21) Appl. No.: 13/543,836

(22) Filed: Jul. 8, 2012

(65) Prior Publication Data

US 2014/0013090 A1 Jan. 9, 2014

(51) Int. Cl.
*G06F 9/45* (2006.01)
*G06F 9/46* (2006.01)

(52) U.S. Cl.
CPC ............... *G06F 8/443* (2013.01); *G06F 9/467* (2013.01)

(58) Field of Classification Search
CPC ....................................................... G06F 9/467
USPC ......................................................... 717/154
See application file for complete search history.

(56) References Cited

U.S. PATENT DOCUMENTS

| 6,594,824 B1* | 7/2003 | Volkonsky et al. ........... 717/159 |
| 2009/0172654 A1 | 7/2009 | Zhao et al. |
| 2011/0209151 A1* | 8/2011 | Chung et al. .................. 718/101 |
| 2011/0214016 A1* | 9/2011 | Gschwind ....................... 714/16 |

OTHER PUBLICATIONS

Disclosed Anonymously, "Method for Flattening Conditional Statements for Freqeuently-Executed Code Path using Try and Catch Blocks", Jan. 17, 2011, IP.com.*
Haber et al., "Method for Flattening Conditional Statements for Freqeuently-Executed Code Path using Try and Catch blocks", IP.com Prior Art Database Disclosure, Disclosure No. IPCOM000203053D, Jan. 17, 2011. URL: http://ip.com/IPCOM/000203053.

* cited by examiner

*Primary Examiner* — Li B Zhen
*Assistant Examiner* — Sen Chen
(74) *Attorney, Agent, or Firm* — Ziv Glazberg, Esq.

(57) ABSTRACT

A method for flattening conditional statements, the method comprises: obtaining a program code, the program code comprising a conditional control flow program construct, which conditional control flow program construct when read by a target processor, causes the target processor to select a control flow path for execution between at least a first and a second control flow paths, wherein said selection is based on an evaluation of a condition of the conditional control flow program construct; replacing the conditional control flow program construct with a transaction-based control flow program construct, which when read by the target processor is operative to cause the target processor to commence a transaction, the transaction configured to execute the first control flow path; and wherein the transaction-based control flow program construct is operative to cause the target processor to execute the conditional control flow program construct in case the transaction is rolled back.

11 Claims, 2 Drawing Sheets

FLATTENING CONDITIONAL STATEMENTS

TECHNICAL FIELD

The present disclosure relates to code optimization in general, and to reducing the number of conditional control flow program construct performed during execution of a program code, in particular.

BACKGROUND

A conditional control flow program construct, also referred to as a conditional statement, is a program instruction that is operative to determine control flow based on an evaluated predicate. Based on the evaluated predicate, the conditional control flow program construct may select between two or more alternative control paths for execution. The conditional control flow program construct may be a part of a high-level programming language, assembly language, low-level processor instructions, or any other programming language. Non-limiting examples of conditional control flow program construct may be "if . . . then . . . else" statement, switch statement, conditional goto statement, or the like.

In some exemplary embodiments, the disclosed subject matter may be limited to conditional control flow program construct of a conditional branching form.

In code optimization, it may be desired to reduce a number of conditional control flow program construct to increase performance. In some cases, even more so when the optimization is aimed at increasing parallel execution of the code.

BRIEF SUMMARY OF THE INVENTION

One exemplary embodiment of the disclosed subject matter is a computer-implemented method performed by a computer having a processor and memory, the method comprising: obtaining a program code, the program code comprising a conditional control flow program construct, which conditional control flow program construct when read by a target processor, causes the target processor to select a control flow path for execution between at least a first and a second control flow paths, wherein said selection is based on an evaluation of a condition of the conditional control flow program construct; replacing the conditional control flow program construct with a transaction-based control flow program construct, which when read by the target processor is operative to cause the target processor to commence a transaction, the transaction configured to execute the first control flow path; and wherein the transaction-based control flow program construct is operative to cause the target processor to execute the conditional control flow program construct in case the transaction is rolled back.

Another exemplary embodiment of the disclosed subject matter is a computerized apparatus having a processor, the processor being adapted to perform the steps of: obtaining a program code, the program code comprising a conditional control flow program construct, which conditional control flow program construct when read by a target processor, causes the target processor to select a control flow path for execution between at least a first and a second control flow paths, wherein said selection is based on an evaluation of a condition of the conditional control flow program construct; replacing the conditional control flow program construct with a transaction-based control flow program construct, which when read by the target processor is operative to cause the target processor to commence a transaction, the transaction configured to execute the first control flow path; and wherein the transaction-based control flow program construct is operative to cause the target processor to execute the conditional control flow program construct in case the transaction is rolled back.

Yet another exemplary embodiment of the disclosed subject matter is a computer program product comprising: a non-transitory computer readable medium retaining program instructions, which instructions when read by a processor, cause the processor to perform the steps of: obtaining a program code, the program code comprising a conditional control flow program construct, which conditional control flow program construct when read by a target processor, causes the target processor to select a control flow path for execution between at least a first and a second control flow paths, wherein said selection is based on an evaluation of a condition of the conditional control flow program construct; replacing the conditional control flow program construct with a transaction-based control flow program construct, which when read by the target processor is operative to cause the target processor to commence a transaction, the transaction configured to execute the first control flow path; and wherein the transaction-based control flow program construct is operative to cause the target processor to execute the conditional control flow program construct in case the transaction is rolled back.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1:
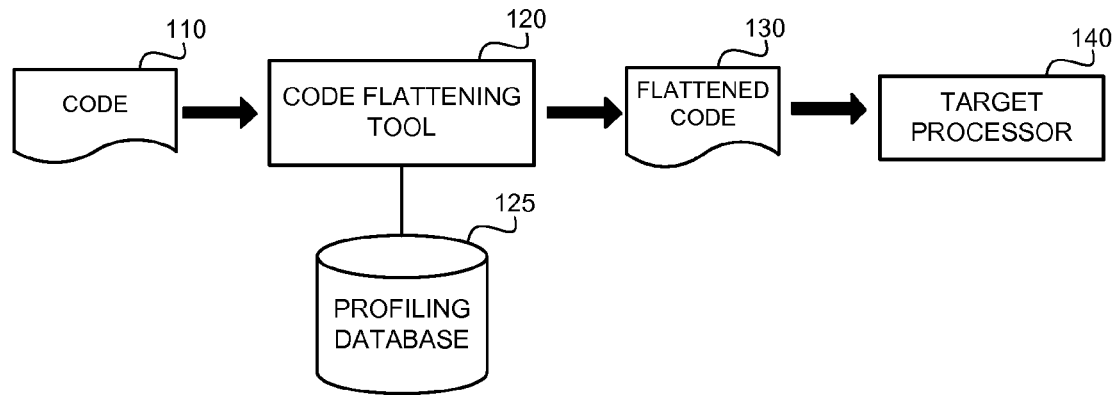
FIG. 1 shows a conceptual illustration of a computerized environment, in accordance with some exemplary embodiments of the disclosed subject matter.

The disclosed subject matter is described below with reference to flowchart illustrations and/or block diagrams of methods, apparatus (systems) and computer program products according to embodiments of the subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

One technical problem dealt with by the disclosed subject matter is to reduce the number of conditional statements that are executed when a computer program is performed. In some cases, some control flow paths are rarely taken, such as in case that the condition associated with taking them is rarely fulfilled. One such example, is the case of corner cases, which though need to be handled by the computer program may be relevant only in rare occurrences.

Another technical problem is to improve performance of code execution. On some architectures the associated cost, e.g., in terms of resource utilization, of executing conditional statements is higher than that of unconditional statements. In some exemplary embodiments, unconditional control flow paths may be executed in parallel by different processors, processor cores, hardware threads, or similar processing entities, thereby increasing performance.

One technical solution is to replace a conditional control flow program construct with a substantially equivalent code that is to be executed in some cases without any conditional statements. The equivalent code may comprise: initiating a transaction and upon detection of a rollback of the transaction, performing the conditional control flow program construct. The transaction may be configured to execute one possible control flow path defined by the conditional control flow program construct. The transaction may include an instruction that is configured to cause a rollback when the control flow path is not taken.

In some exemplary embodiments, one control flow path out of the alternative control flow paths defined by the conditional control flow program construct is selected to be executed in the transaction. The control flow path that is more likely to be taken may be selected, such as based on profiling data obtained during execution of the code, based on user input, based on other heuristic decisions, or the like.

In some exemplary embodiments, a conditional control flow program construct having a control flow path that is likely to be performed in a majority of the executions above a predetermined threshold, may be processed in accordance with the disclosed subject matter, such as above 75% of the executions.

In some exemplary embodiments, hardware transaction mechanism, which is relatively efficient, may be used. In some exemplary embodiments, existing hardware exception handlers may be mapped to the new hardware supported rollback mechanism. Using hardware transaction may enable a fast user-level abort to rollback code which is associated with a relatively small penalty for invoking the rollback.

Additionally or alternatively, software transaction mechanism, such as for example software handled exceptions or software-implemented transactions, may be used. In some exemplary embodiments, exceptions may be raised based on preexisting rules, such as upon division by zero, upon out of bound access to an array, or the like. Raising such exceptions is disclosed in detail in Yousef Shajrawi, Gad Haber, and Marcel Zalmanovici "Method for Flattening Conditional Statements for Freqeuently-Executed Code Path using Try and Catch blocks" published on IP.com Prior Art Database Disclosure on Jan. 17, 2011, which is hereby incorporated by reference in its entirety.

Another technical solution is to flatten looping statement, thereby allowing for an optimization of flattened loop statements. It will be understood that the term "flatten" is used in this context to refer to modifying a code having conditional branching statement to a flattened code having a smaller number of conditional branching statements if at all. In some exemplary embodiments, the flattened code is functionally equivalent to one or more of the control flow paths defined by the code. In some exemplary embodiments of the disclosed subject matter functional equivalency of the code is maintained through the use of a transaction rollback mechanism instead of the use of conditional branching statements. As is further explained hereinbelow, the transaction rollback mechanism may be initiated in case the one or more control flow paths are not to be taken. Upon a rollback the original code may be executed thereby maintaining the functional behavior of the original code.

One technical effect of the disclosed subject matter is improving performance of the program code by reducing a number of conditional statements that are performed in the average case, in the common case, or the like.

In some exemplary embodiments, extracting frequently executed statements from within conditional statements may improve performance and reduce resource consumption significantly.

In some exemplary embodiments, the frequent code is executed without conditions, allowing for optimized execution in most cases. In case a different control flow path is to be taken, original code is performed, thereby maintaining functional correctness of the modified code.

Another technical effect is flattening a conditional code thereby allowing the looping statements to be optimized using other known techniques, such as vectorization, parallelization, or the like.

In some exemplary embodiments, in a similar manner, functions code may be flattened and function-based compiler optimizations, such as for example function specialization may be performed.

Referring now to FIG. 1 showing a conceptual illustration of a computerized environment, in accordance with some exemplary embodiments of the disclosed subject matter.

Code 110, such as program code, may be provided in any programming language, such as but not limited to high-level programming language, intermediate language, assembly language or the like. Code 110 may be retained in computer-readable medium, such as for example computer-readable storage.

A Code Flattening Tool 120 may be configured to obtain Code 110 and generate Flattened Code 130. Execution of Flattened Code 130, such as by a Target Processor 140, performs a reduced number of conditional control flow program construct with respect to Code 110. In some exemplary embodiments, the functionality of Code 110 is not modified so that based on the same input the same output will be provided by an execution Flattened Code 130 as an execution of Code 110.

In some exemplary embodiments, Flattened Code 130 may be further optimized, such as using any optimization technique. In some exemplary embodiments, Code Flattening Tool 120 may be configured to flatten portions of Code 110 so as to enable to optimize those portions, such as by performing them substantially in parallel.

In some exemplary embodiments, Code Flattening Tool 120 may identify, either automatically, semi-automatically, or based on user input, looping instructions that, if flattened, can be parallelized. Code Flattening Tool 120 may determine whether or not to attempt flattening the loop control flow to a single control path thereby enabling parallelization thereof, a more efficient parallelization thereof, or the like.

In some exemplary embodiments, Code Flattening Tool 120 may be receptive to user input assisting in choosing portions of Code 110 to flatten.

In some exemplary embodiments, Code Flattening Tool 120 may choose one control flow path out of multiple alternative control flow paths, such as based on the likelihood that the control flow path will be taken. The control flow path may be selected based on a probability of taking each path, as determined with respect to executions of Code 110 or similar data retained in Profiling Database 125. Additionally or alternatively, the selection may be based on a heuristic determination which is based on static analysis of Code 110. Other heuristics for identifying which control flow path is more likely to be executed may be examined.

Figure 2:
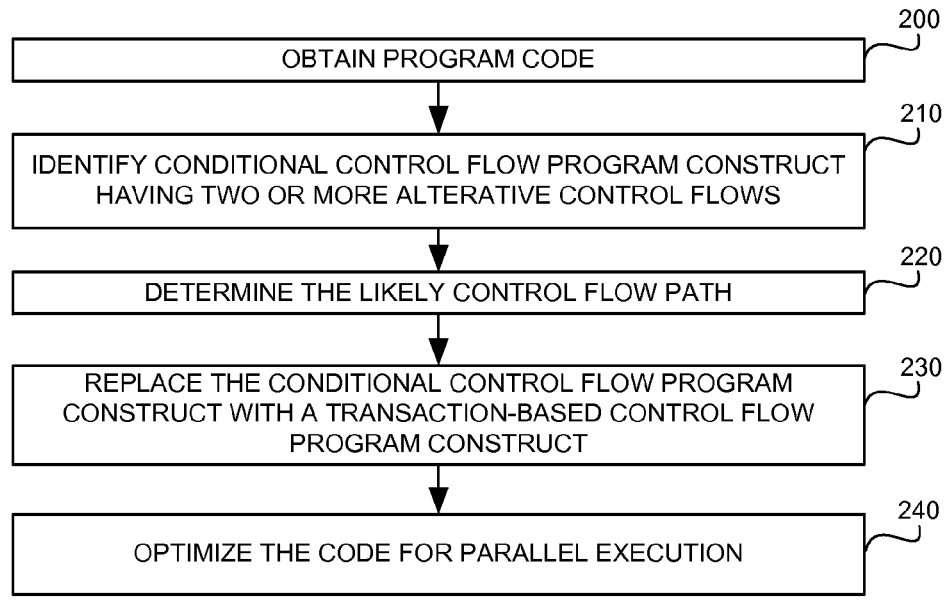
FIG. 2 shows a flowchart diagram of a method, in accordance with some exemplary embodiments of the disclosed subject matter.

Referring now to FIG. 2 showing a flowchart diagram of a method, in accordance with some exemplary embodiments of the disclosed subject matter.

In Step 200, program code, such as Code 110, may be obtained.

In Step 210, conditional control flow program construct may be identified. The control flow construct may have two or more alternative control flow paths.

In Step 220, a likelihood of each alternative control flow path may be determined, in order to determine the likely control flow path. In some exemplary embodiments, the likely control flow path is a control flow path that is most likely to be executed. Additionally or alternatively, the likely control flow path is a control flow path that is executed in a significant portion of the executions, such as above 60% of the executions.

In Step 230, the conditional control flow program construct is replaced with a transaction-based control flow program construct. The transaction-based control flow program construct is operative to execute a transaction during which the likely control flow path is executed and the conditions to take the likely control flow path are held is verified. In the event that the conditions are not met, the transaction is configured to rollback and in response to perform the control flow program construct. In some exemplary embodiments, execution of the transaction is performed without executing a conditional branching statement. After code replacement, the code may be said to be "flattened".

In Step 240, the flattened code may be optimized, such as for example, optimization for parallel execution.

Figure 3:
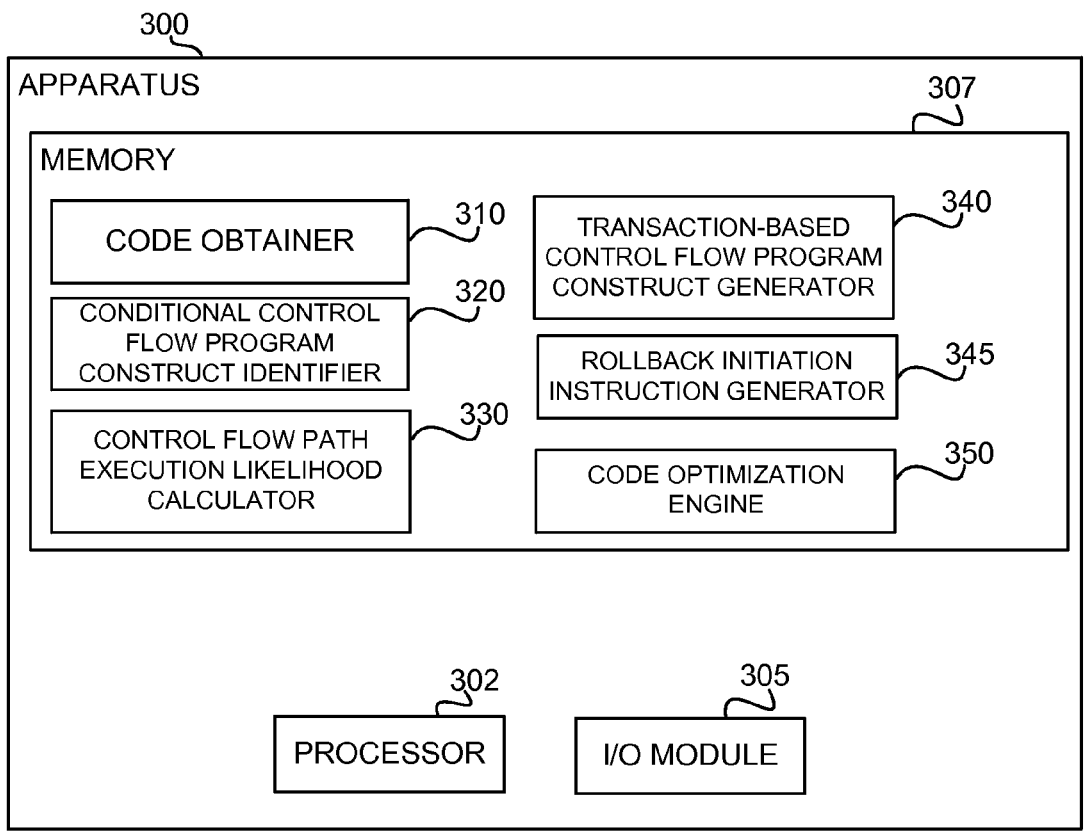
FIG. 3 shows a block diagram of an apparatus, in accordance with some exemplary embodiments of the disclosed subject matter.

Referring now to FIG. 3 showing a block diagram of an apparatus, in accordance with some exemplary embodiments of the disclosed subject matter.

In some exemplary embodiments, an Apparatus 300, such as Code Flattening Tool 120, may comprise a Processor 302. Processor 302 may be a Central Processing Unit (CPU), a microprocessor, an electronic circuit, an Integrated Circuit (IC) or the like. Processor 302 may be utilized to perform computations required by Apparatus 300 or any of its subcomponents. Processor 302 may be configured to execute computer-programs useful in performing the method of FIG. 2 or the like In some exemplary embodiments of the disclosed subject matter, Apparatus 300 may comprise an Input/Output (I/O) Module 305. I/O Module 305 may be utilized to provide an output to and receive input from a user. I/O Module 305 may be operative to provide an error report to a user. Additionally or alternatively, I/O Module 305 may enable Apparatus 300 to obtain Code 110 and/or output Flattened Code 130.

In some exemplary embodiments, Apparatus 300 may comprise a Memory Unit 307. Memory Unit 307 may be a short-term storage device or long-term storage device. Memory Unit 307 may be a persistent storage or volatile storage. Memory Unit 307 may be a disk drive, a Flash disk, a Random Access Memory (RAM), a memory chip, or the like. In some exemplary embodiments, Memory Unit 307 may retain program code operative to cause Processor 302 to perform acts associated with any of the subcomponents of Apparatus 300. In some exemplary embodiments, Memory Unit 307 may retain program code operative to cause Processor 302 to perform acts associated with any of the steps in FIG. 2 above. Additionally or alternatively, Memory Unit 307 may retain Code 110 and/or Flattened Code 130.

The components detailed below may be implemented as one or more sets of interrelated computer instructions, executed for example by Processor 302 or by another processor. The components may be arranged as one or more executable files, dynamic libraries, static libraries, methods, functions, services, or the like, programmed in any programming language and under any computing environment.

A Code Obtainer 310 may be configured to obtain code for processing, such as Code 110.

A Conditional Control Flow Program Construct Identifier 320 may be configured to identify a conditional control flow program construct in the code for processing. In some exemplary embodiments, only some conditional control flow program constructs of the code are processed, such as those constructs that are determined to make it difficult to optimize the code using a predetermined optimization technique.

Control Flow Path Execution Likelihood Calculator 330 may be configured to compute a likelihood of execution of each alternative control flow path defined by a conditional control flow program construct. In some exemplary embodiments, Control Flow Path Execution Likelihood Calculator 330 may compute a statistical probability of each control flow path being taken based on recorded executions.

Transaction-Based Control Flow Program Construct Generator 340 may be configured to generate transaction-based control flow program construct for replacing a conditional control flow program construct. The transaction-based control flow program construct may comprise instructions for initiating a transaction that (1) validates that a condition for performing a control flow path is held and (2) executes the control flow path. The transaction-based control flow program construct further comprises an instruction for causing a rollback of the transaction in response to the condition being violated. In response to a rollback, the original conditional control flow program construct may be executed.

In some exemplary embodiments, Rollback Initiation Instruction Generator 345 may be configured to generate instructions for initiating a rollback of the transaction in response to a violation of the condition. In some exemplary embodiments, hardware rollback may be utilized. Existing hardware rollback mechanism may be tweaked, such as using a dedicated bit to invoke rollbacks. In some exemplary embodiments, the rollback may be initiated by raising a flag that is associated with a hardware transaction mechanism. Additionally or alternatively, in case that a software transaction mechanism is used, the rollback may be initiated by causing an exception to be thrown. In some exemplary embodiments, an instruction that is configured to raise the exception only in case the condition is held may be generated, such as an instruction that performs a division that would divide by zero in case the condition is violated. As another example, the instruction may access an array and be configured to perform an out of bounds array access in case the condition is violated.

Apparatus 300 may be configured to identify a conditional control flow program, determine a preferred control flow path, generate a transaction-based control flow program construct in which the preferred control flow path is performed without any conditional branching statements, and replace the conditional control flow program construct with the transaction-based control flow program construct thereby generating a flattened code. In some exemplary embodiments, a plurality of conditional control flow program constructs may be flattened.

Code Optimization Engine 350 may be configured to optimize a code, such as a flattened code. Code Optimization Engine 350 may transform the code to an equivalent code that is considered to be using available resources in a more efficient manner. One non-limiting example of such optimization may be performing different instructions by different processing entities thereby increasing concurrency.

The following are non-limiting examples of code flattening.

Consider the following original code:

```
if ( condition ) {
    // do work
} else {
    // special, rare case
}
```

In accordance with the disclosed subject matter, the conditional control flow program construct "if ... else" may be replaced with a transaction-based control flow program construct of the following form:

```
transaction
{
    // perform instruction that causes rollback in case
        condition is not held
    // do work
}
rollback ...
{
    if (condition) {
        // do work
    } else {
        // special, rare case
    }
}
```

As another example consider the following. Assume an array whose elements are rarely assigned the value zero, but when processing, this corner case requires special treatment in the code. The original code may be:

```
for (int i = 0; i < N; ++i) {
    if ( x[i]==0 ) { // this condition is RARELY taken
        x[i] += a[i];
    } else {
        x[i] += b[i];
    }
}
```

In accordance with the disclosed subject matter, the conditional control flow program construct "for" which embeds a conditional branching statement (if ... else) may be replaced with a transaction-based control flow program construct. In some exemplary embodiments, the transaction-based control flow program construct utilize hardware transaction. For example, a designated register, denoted as REG, may be used to notify the hardware mechanism when to cause a rollback. A specific bit within REG, denoted as FLAG, may be associated with a specific rollback type, such as user-defined rollback. In some exemplary embodiments, the flag may be raised implicitly, such as based on code the compiler introduces. In some exemplary embodiments, inside a transaction block, all compare operations raise a flag if the comparison is evaluated to a predetermined value. Additionally or alternatively, the value of FLAG may be modified explicitly using a setFlag function which takes two parameters, the flag to be modified and the updated value of the flag. In such a case, the modified code may be:

```
transaction {
    for (int i = 0; i < N; ++i) {
        setFlag(FLAG, (x[i]==0))    //_cause HW rollback when
                                    // x[i]==0
        x[i] += b[i];
    }
}
rollback (FLAG) {    // rollback behavior in case FLAG is
                     // raised during the transaction
    for (int i = 0; i < N; ++i){
    {
        if ( x[i] == 0 ) {
            x[i] += a[i];
        } else {
            x[i] += b[i];
        }
    }
}
```

As can be appreciated, when the condition (x[i]==0) is true, flag FLAG is raised. Upon FLAG being raised, the transaction is rolled back and the rollback behavior defined using the rollback predicate for FLAG is performed. If the condition is violated, FLAG is not raised, and the common control flow path (in which all elements are different than zero) is performed without performing any conditional branching statements. In some exemplary embodiments, the inherent conditional branching statement of the for loop may also be removed by utilizing parfor statement instead thereof.

In some exemplary embodiments, the "for" statement in the transaction may be replaced by an equivalent and more suitable form for parallelization denoted "parfor".

In some exemplary embodiments, evaluation of the halting condition of the for loop is possible at compile time. In such a case, the loop may be unrolled and the conditional branching statement associated with the loop halting condition may be avoided, as is known in the art.

Additionally or alternatively, the transaction-based control flow program construct may be implemented using software-based mechanism, such as exception handlers:

```
transaction {
    for (int i = 0; i < N; ++i) {
        int dummy=1/x[i]; //raises an exception when x[i]==0
        x[i] += b[i];
    }
} catch ( ArithmeticException e) {
    for (int i = 0; i < N; ++i){
    {
```

```
        if ( x[i] == 0 ) {
            x[i] += a[i];
        } else {
            x[i] += b[i];
        }
    }
```

As can be appreciated, the transaction does not comprise any of the "if . . . else" conditional branching statements. Instead, control flow is handled by causing an exception in the rare case that one of the array elements is evaluated to zero.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of program code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As will be appreciated by one skilled in the art, the disclosed subject matter may be embodied as a system, method or computer program product. Accordingly, the disclosed subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, and the like.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method performed by a computer having a processor and memory, the method comprising:
    obtaining a program code, the program code comprising a conditional control flow program construct, which conditional control flow program construct when read by a target processor, causes the target processor to select a control flow path for execution between at least a first and a second control flow paths, wherein said selection is based on an evaluation of a condition of the conditional control flow program construct;
    determining a likelihood of the first control flow path to be taken during execution;

in response to the likelihood of the first control flow path to be taken during execution exceeding a predetermined threshold of at least 75%, replacing the conditional control flow program construct with a transaction-based control flow program construct, which when read by the target processor is operative to cause the target processor to commence a transaction, the transaction configured to execute the first control flow path;

wherein the transaction-based control flow program construct is operative to cause the target processor to execute the conditional control flow program construct in case the transaction is rolled back;

wherein in case the condition is evaluated to a predetermined value the first control flow path is selected; and wherein the transaction-based control flow program construct comprises a transaction instruction, the transaction instruction when read by the target processor is configured to commence a transaction, the transaction comprising:

evaluating the condition;

causing a rollback in case the evaluated condition is different than the predetermined value; and executing the first control flow path.

2. The method of claim 1, wherein the transaction instruction consists of a single control flow path and does not include any branching instructions.

3. The method of claim 1, wherein the conditional control flow program construct comprises a looping statement that is to be executed substantially in parallel.

4. The method of claim 3, wherein the looping statement further comprises a conditional branching statement to be performed in iterations of the looping statement, wherein during an iteration of the looping statement a control flow path for execution is selected between the at least first and second control flow paths.

5. The method of claim 1, wherein the transaction is a hardware transaction; and wherein causing the rollback is performed by raising a hardware flag.

6. The method of claim 1, wherein the transaction is software transaction; and wherein causing the rollback is performed by causing an exception to be thrown.

7. The method of claim 6, wherein said causing the exception to be thrown comprises: performing an instruction that is operative to throw an exception in case the evaluation of the condition causes execution of any control flow path other than the first control flow path.

8. A computerized apparatus having a processor, the processor programmed with instructions to perform the steps of:

obtaining a program code, the program code comprising a conditional control flow program construct, which conditional control flow program construct when read by a target processor, causes the target processor to select a control flow path for execution between at least a first and a second control flow paths, wherein said selection is based on an evaluation of a condition of the conditional control flow program construct;

determining a likelihood of the first control flow path to be taken during execution;

in response to the likelihood of the first control flow path to be taken during execution exceeding a predetermined threshold of at least 75%, replacing the conditional control flow program construct with a transaction-based control flow program construct, which when read by the target processor is operative to cause the target processor to commence a transaction, the transaction configured to execute the first control flow path;

wherein the transaction-based control flow program construct is operative to cause the target processor to execute the conditional control flow program construct in case the transaction is rolled back;

wherein in case the condition is evaluated to a predetermined value die first control flow path is selected; and wherein the transaction-based control flow program construct comprises a transaction instruction, the transaction instruction when read by the target processor is configured to commence a transaction, the transaction comprising:

evaluating the condition;

causing a rollback in case the evaluated condition is different than the predetermined value; and executing the first control flow path.

9. The apparatus of claim 8, wherein the conditional control flow program construct comprises a looping statement that is to be executed substantially in parallel.

10. The apparatus of claim 8, wherein the transaction is a hardware transaction;

and wherein causing the rollback is performed by raising a hardware flag.

11. A computer program product comprising:

a non-transitory computer readable medium retaining program instructions, which instructions when read by a processor, cause the processor to perform the steps of:

obtaining a program code, the program code comprising a conditional control flow program construct, which conditional control flow program construct when read by a target processor, causes the target processor to select a control flow path for execution between at least a first and a second control flow paths, wherein said selection is based on an evaluation of a condition of the conditional control flow program construct;

determining a likelihood of the first control flow path to be taken during execution;

in response to the likelihood of the first control flow path to be taken during execution exceeding a predetermined threshold of at least 75%, replacing the conditional control flow program construct with a transaction-based control flow program construct, which when read by the target processor is operative to cause the target processor to commence a transaction, the transaction configured to execute the first control flow path;

wherein the transaction-based control flow program construct is operative to cause the target processor to execute the conditional control flow program construct in case the transaction is rolled back;

wherein in case the condition is evaluated to a predetermined value the first control flow path is selected; and wherein the transaction-based control flow program construct comprises a transaction instruction, the transaction instruction when read by the target processor is configured to commence a transaction, the transaction comprising:

evaluating the condition;

causing a rollback in case the evaluated condition is different than the predetermined value; and executing the first control flow path.

\* \* \* \* \*